United States Patent [19]

Thomas

[11] Patent Number: 5,228,479

[45] Date of Patent: Jul. 20, 1993

[54] MULTI-LAYERED FLEXIBLE PIPING AND METHOD AND MACHINE FOR FORMING SAME

[75] Inventor: Roy W. Thomas, Kansas City, Mo.

[73] Assignee: Tru-Flex Metal Hose Corporation, Lebanon, Ind.

[21] Appl. No.: 716,851

[22] Filed: Jun. 17, 1991

[51] Int. Cl.$^5$ .............................................. F16L 9/14
[52] U.S. Cl. .................... 138/149; 138/122; 138/135; 138/154; 138/143; 138/144
[58] Field of Search ............... 138/149, 122, 129, 134, 138/135, 143, 144, 154, 173, 136, 114, 131, 150; 181/207, 227, 228, 252; 60/320, 322

[56] References Cited

U.S. PATENT DOCUMENTS

| | | | |
|---|---|---|---|
| 925,317 | 6/1909 | Eldred | 138/136 |
| 1,133,070 | 3/1915 | Subers | 138/135 |
| 1,315,548 | 9/1919 | Fletcher | 138/135 |
| 1,913,390 | 6/1933 | Hungerford | 138/135 |
| 1,978,529 | 10/1934 | Harrah | 138/135 |
| 2,013,193 | 9/1935 | Stadtfeld | 138/114 |
| 2,609,002 | 9/1952 | Meissner | 138/122 |
| 2,841,183 | 7/1958 | Rejeski | 138/135 |
| 3,299,417 | 1/1967 | Sibthorpe | 138/114 |
| 3,473,575 | 10/1969 | Vogelsang | 138/114 |
| 3,621,663 | 11/1971 | Otani | 138/134 |
| 3,815,639 | 6/1974 | Westerbarkey | 138/122 |
| 3,948,295 | 4/1976 | Lemont et al. | 138/149 |
| 4,141,385 | 2/1979 | Siegwart | 138/136 |
| 4,160,312 | 7/1979 | Nyssen | 138/150 |
| 4,197,728 | 4/1980 | McGowen . | |
| 4,262,162 | 4/1981 | Plinke et al. | 138/114 |
| 4,303,105 | 12/1981 | Rohner | 138/149 |
| 4,445,543 | 5/1984 | Mead | 138/122 |
| 4,481,978 | 11/1984 | Escandell | 138/122 |
| 4,712,642 | 12/1987 | Lalikos et al. | 181/207 |
| 4,854,416 | 8/1989 | Lalikos et al. | 181/207 |

FOREIGN PATENT DOCUMENTS 1067903 10/1959 Fed. Rep. of Germany ...... 138/122

Primary Examiner—Harvey C. Hornsby
Assistant Examiner—James F. Hook
Attorney, Agent, or Firm—Litman, McMahon & Brown

[57] ABSTRACT

Flexible piping includes a first, spiral-wound band forming an inner winding and a second, spiral-wound band forming an outer winding in covering relationship over the inner winding. Inner and outer spiral-wound bands of insulating material are wound between the inner and outer windings and over the outer winding respectively. An insulating sleeve receives the spiral-wound inner and outer windings and the inner and outer insulating material bands. A method and a machine for forming the flexible piping are also disclosed.

13 Claims, 2 Drawing Sheets

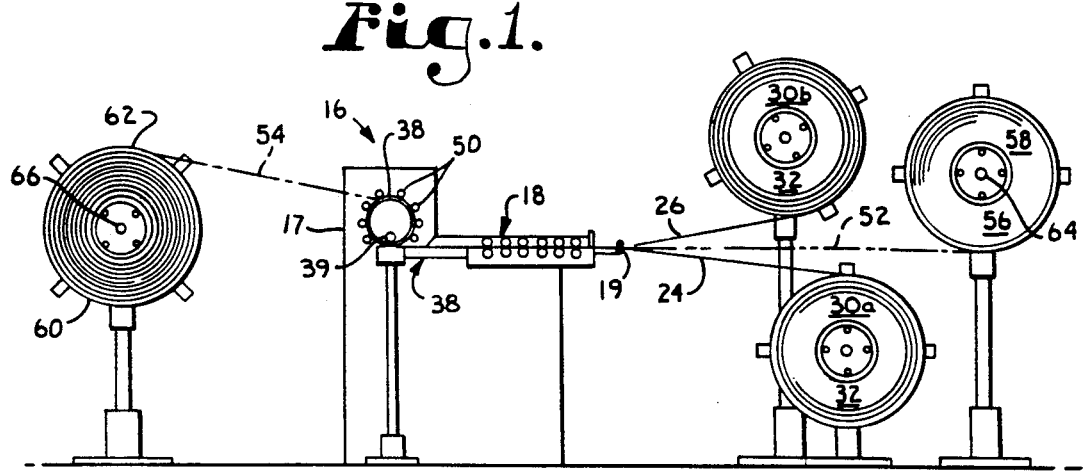
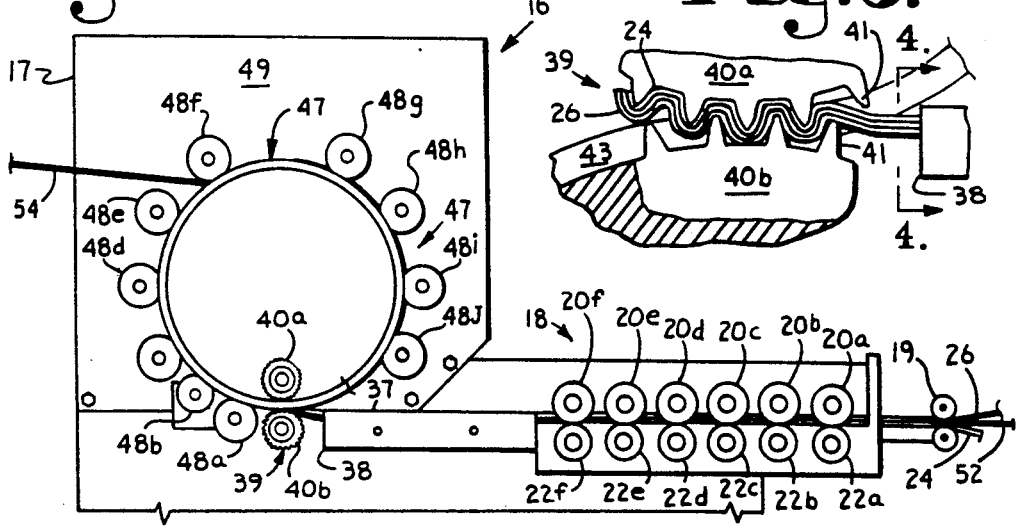
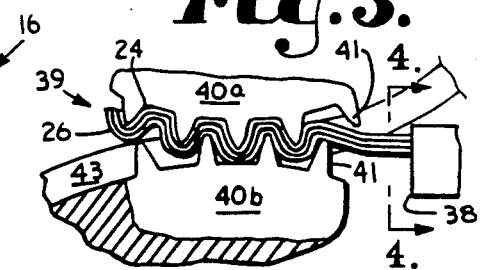
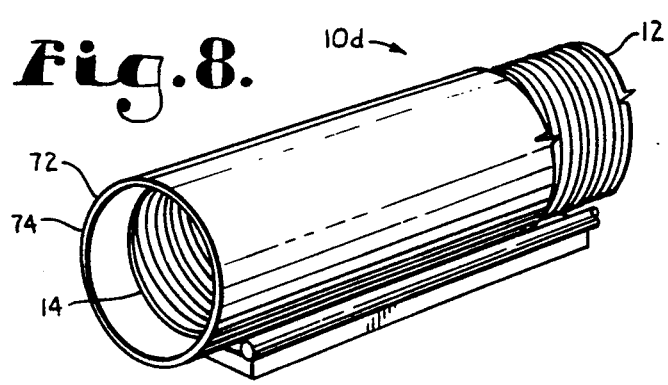
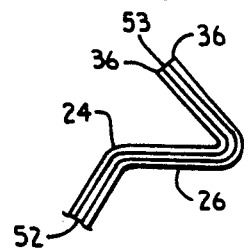

MULTI-LAYERED FLEXIBLE PIPING AND METHOD AND MACHINE FOR FORMING SAME

BACKGROUND OF THE INVENTION

1. Field of the Invention

The present invention relates generally to flexible piping, and in particular to multi-layered flexible piping with an insulating layer or layers.

2. Description of the Related Art

Flexible piping is utilized in a variety of applications. For example, flexible piping or hose can be used for conveying various fluids, such as exhaust gases from internal combustion engines in vehicles and other equipment, for ventilation, for fuel hose such as on gas grills, and for lining chimneys and flues. Flexible piping or hose can also be used for conveying bulk materials, such as dust, pellets, grain, etc. One type of flexible piping can be formed by spiral-winding material bands or windings on a pipe winding machine. Previous types of pipe winding machines have used hook-shaped band guides and rotating mandrels for spiral-winding flexible piping. For example, the McGowen U.S. Pat. No. 4,197,728 discloses a pipe winding machine with a rotating mandrel for receiving bands from a series of profiling rollers which shape the bands for interlocking engagement on the mandrel. Piping formed in this manner is flexible because the interlocking connection of the band edges permits limited axial slippage between adjacent bands.

Another type of pipe winding machine uses profiling rollers for imparting a convoluted cross-sectional configuration to a continuous length of band material. The band edges are interlocked by knurling wheels with this type of machine. Piping flexibility is provided by the convolutions of the band, which permit axial compression and expansion.

An advantage of having piping sections formed by spiral-winding is that they can be formed to practically any length and with various diameters. However, forming a fluid-tight seal between the interlocking, spiral-wound bands can be difficult, particularly since the interlocking bands often have sliding metal-to-metal contact areas which can pass fluid.

In many flexible piping applications it may be desirable to insulate the flexible piping. Such insulation can provide thermal, moisture and corrosion protection and control. For example, a layer of insulation may be desirable for providing a vapor barrier to control exposure of the flexible piping to moisture. Insulation may also be desirable to achieve fluid-tightness with flexible piping which conducts exhaust fumes or other fluids with undesirable (e.g., toxic) properties, and to contain such fluids within a fluid-handling system including insulated flexible piping to protect persons, property and the environment from exposure to such undesirable and potentially harmful fluids.

Heretofore there has not been available flexible piping, a method of producing same or a machine for producing same, with the advantages and features of the present invention.

SUMMARY OF THE INVENTION

In practice of the present invention, flexible piping is provided which includes inner and outer material bands or windings which are spiral-wound and interlocked with the outer material band overlying the inner material band. An insulating material band is spiral-wound between the inner and outer material bands in one embodiment of the invention, and is spiral-wound over the outer winding in another embodiment of the invention. Further embodiments of the invention can include multiple, spiral wound insulating material bands. A method and a machine for forming insulated flexible piping are also provided in the practice of the present invention. In the practice of the method of the present invention, an inner winding is spiral-wound on a winding machine and an outer winding is wound thereover in overlying relation. The inner and outer windings are interlocked. An insulating material band is wound on the windings. The method can include the steps of winding the insulating material band between the inner and outer windings, over the outer winding, or both. Further in the practice of the present invention, a machine is provided for winding the multi-layered flexible piping and includes stations for feeding inner and outer windings and inner and outer bands of insulating material.

OBJECTS AND ADVANTAGES OF THE INVENTION

The objects and advantages of the present invention include: providing flexible piping; providing multi-layered flexible piping; providing insulated flexible piping; providing flexible piping with an insulating corrosion barrier; providing flexible piping with an insulating thermal barrier; providing flexible piping with an insulating fluid barrier; providing flexible piping with multiple, alternating layers comprising metal windings and insulating bands; providing flexible piping which effectively contains and conveys fluids; providing such flexible piping which can be formed from various materials; providing such flexible piping which can be adapted to convey various substances; providing such flexible piping which can be formed on existing pipe-winding equipment with relatively minor modifications thereto; providing such flexible piping which is economical to manufacture, efficient in operation and particularly well adapted for the proposed usage thereof; providing a method for forming flexible piping; and providing a machine for forming flexible piping.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of a flexible pipe winding apparatus or machine embodying the present invention.

FIG. 2 is an enlarged, fragmentary, side elevational view of the flexible pipe winding apparatus or machine.

FIG. 3 is an enlarged, fragmentary side elevational view of the flexible pipe winding apparatus or machine, particularly showing a knurling station thereof.

FIG. 4 is an enlarged, fragmentary, cross-sectional view taken generally along line 4—4 in FIG. 3 and particularly showing a composite band just prior to entering the knurling station.

FIG. 8 is a perspective view of flexible piping comprising a third modified or alternative embodiment of the present invention.

DETAILED DESCRIPTION OF THE PREFERRED EMBODIMENTS

I. Introduction and Environment

Figure 9:
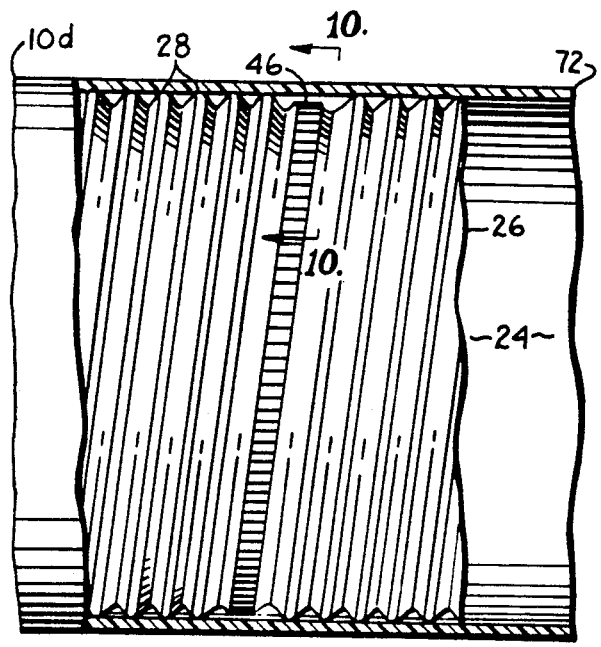
FIG. 9 is a fragmentary, side elevational view of the flexible piping comprising a third modified or alternative embodiment of the present invention, with portions broken away to reveal construction.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 10 generally designates flexible piping embodying the present invention. The flexible piping 10 can be formed in piping sections 12 of various lengths with opposite piping section ends 14. Flexible piping 10 can be formed on a pipe winding machine or apparatus 16.

The pipe winding machine 16 includes a band forming or profiling station 18 with upper profiling rollers 20a-f and lower profiling rollers 22a-f grouped in pairs for profiling a first or inner metal band 24 and a second or outer metal band 26 with convolutions or corrugations 28 the convolutions or corrugations 28 extend longitudinally with respect to the metal bands 24, 26, i.e., generally parallel to the respecitve band leading and trailing edges 34, 36, and extend generally helically after the metal bands 24, 26 are wound into the flexible piping 10. The convolutions 28 generally have the cross-sectional configuration of a wave of constant amplitude and frequency. The metal bands 24, 26 can be fed from band feed stations 30a,b each rotatably mounting a coil 32 of the band material, e.g., steel, aluminum, etc. The bands 24, 26 have first or leading band edges 34 and second or trailing band edges 36.

Downstream of the band forming/profiling station 18 is an edge forming or tucking station 37 with a tucker assembly 38. The metal bands 24, 26 have their respective edges 34, 36 folded at the edge forming/tucking station 37 by the tucker assembly 38 for interlocking engagement.

Downstream of the tucker assembly 38 is a knurling station 39 with a pair of knurling wheels 40a,b with intermeshing teeth 41 for crimping the leading band edges 34 of inner and outer windings 42, 44 which have just passed through the tucker assembly 38 and the trailing band edges 36 of the windings 32, 34 which have just completed a full revolution on the pipe winding machine 16. The knurling wheels 40a,b also include driven, convoluted sections 43 with configurations corresponding to the corrugations or convolutions 28 of the metal bands 24, 26 (FIG. 3). Since the knurling wheel convoluted sections 43 are driven, the teeth 41 thereof can be non-driven, i.e., permitted to idle. The intermeshing teeth 41 form a stitched crimp seam 46 of the band leading and trailing edges 34, 36 at the knurling station 39.

A pipe winding station 47 comprises a plurality of guide/idler rollers 48a-j arrayed in a generally circular configuration on a back plate 49. Each guide roller 48 has a convoluted surface configuration corresponding to the band convolutions 28. The guide rollers 48a-j extend progressively further out from the back plate 49 as they progress clockwise from the knurling station 39 to form a generally helical configuration on the back plate 49. The guide rollers 48a-j thus form a generally helical path for the windings 42, 44, whereby the windings 42, 44 are axially displaced approximately one winding width for each revolution. The guide rollers 48a-j can be pitched, e.g. about 3½° to 7° with respect to the face of the back plate 49, to impart a generally helical configuration to the windings 42, 44. In this manner the flexible piping 10 is spiral-wound as the windings 42, 44 wind around the pipe winding station 47. The spacing and number of the guide rollers 48a-j can be adjusted and varied on the back plate 49 to wind flexible piping 10 with different diameters.

The lengths of piping section 12 which can be formed on the machine 16 are practically unlimited, although it may be desirable to cut the sections 12 into predetermined lengths which are convenient for shipping and installation in the various applications for the flexible piping 10.

II. Insulating Bands 52, 54

A first or inner insulating or sealing material band 52 and a second or outer insulating or sealing material band 54 can be incorporated, individually or in combination, into the flexible piping 10. The first or inner insulating band 52 can be dispensed from a roll or coil 56 at a first insulating band feeding station 58, which can be located in the general vicinity of the band feeding stations 30a,b at an upstream end of the pipe winding machine 16. The second or outer insulating band 54 can be dispensed from a roll or coil 60 at a second insulating band feeding station 62, which can be located, for example, in proximity to a downstream end of the pipe winding machine 16. The feeding stations 58, 62 can rotatably mount the insulating band rolls 56, 60 for dispensing. The first insulating band roll 56 can rotate about a rotational axis 64 which extends generally transversely with respect to the paths of movement of the metal bands 24, 26 and the first insulating band 52 into the band forming station 18. The second insulating band roll 60 can rotate about a rotational axis 66 which extends generally parallel to the flexible piping 10 and its rotational axis.

III. Insulated Piping Configurations 10a–d

Figure 5:
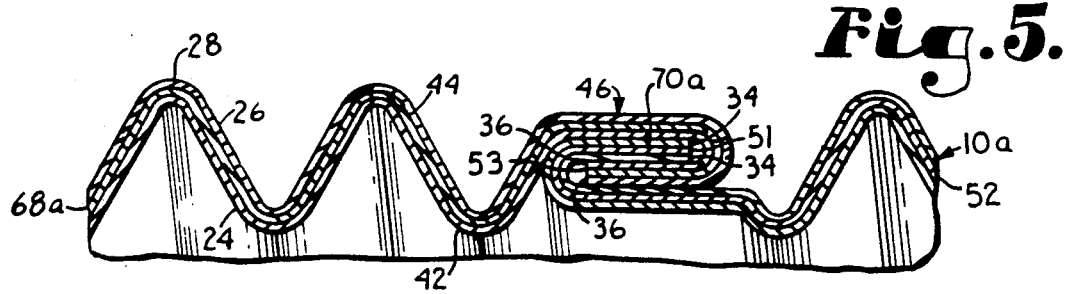
FIG. 5 is a longitudinal, cross-sectional view of flexible piping embodying the present invention.

Insulated, flexible piping 10 according to the present invention can be formed in various configurations on the pipe winding machine 16. FIG. 5 shows a first configuration in cross-section wherein the first or inner insulating band 52 is sandwiched between the inner and outer metal bands 24, 26, whereby a laminated composite band 68a is formed with the insulating band 52 between the inner and outer metal bands 24, 26. The composite band 68a can be pulled through the band forming/profiling station 18 where the corrugations 28 are formed. The corrugated composite band 68a is then passed through the tucker assembly 38 for edge-folding (FIG. 4). The composite band 68a is then spiral-wound on the pipe winding station 47. The band leading and trailing edges 34, 36 are knurled or crimped together with the metal band leading and trailing edges 34, 36 in an interlocking seam 70a with the insulating band leading and trailing edges 51, 53 (FIG. 5).

Figure 6:
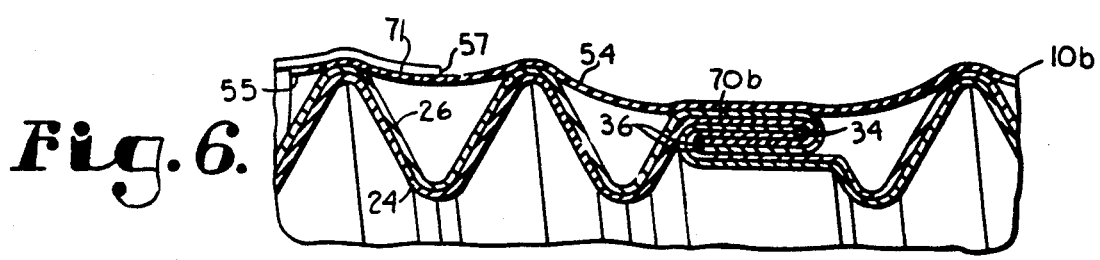
FIG. 6 is a longitudinal, cross-sectional view of flexible piping comprising a first modified or alternative embodiment of the present invention.

Insulated flexible piping 10b comprising a first modified or alternative embodiment of the present invention is shown in FIG. 6 and comprises a composite band 68b with a first or inner metal band 24, a second or outer metal band 26 and an outer insulating band 54 placed in overlying relation, in that order from inside-to-outside. The outer insulating band 54 is applied at the feeding station 62, i.e., subsequent to the forming, spiral-winding and edge interlocking procedures on the metal bands 24, 26 forming an interlocking seam 70b. The outer insulating band 54 can thus form an overlapping seam 71 with its leading and trailing edges 55, 57. The insulating band 54 can comprise a suitable elastomeric material with sufficient stretching and memory characteristics that by winding it on the spiral-wound inner and outer bands 24, 26, under tension, the insulating band 54 would conform somewhat to the corrugated outer surface of the flexible piping 10b.

Figure 7:
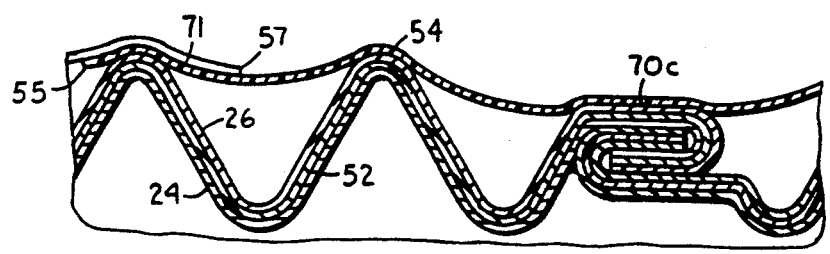
FIG. 7 is a longitudinal, cross-sectional view of flexible piping comprising a second modified or alternative embodiment of the present invention.

Flexible piping 10c is shown in FIG. 7 and comprises a second modified or alternative embodiment of the present invention and includes the inner metal band 24, the inner insulating band 52, the outer metal band 26, and the outer insulating band 54 (in that order from inside-to-outside) whereby double layers of metal 26, 28 alternate with double layers of insulation 52, 54 in a composite band 68c. An interlocking seam 70c is formed by the metallic material band leading and trailing edges 34, 36 and by the inner insulating band leading and trailing edges 51, 53. An overlapping seam 71 is formed by the outer insulating band leading and trailing edges 55, 57.

Figure 10:
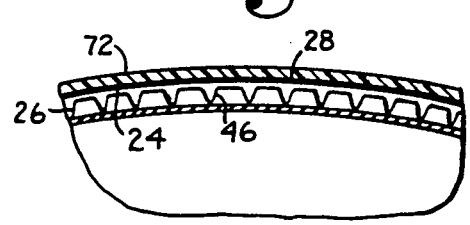
FIG. 10 is a transverse, fragmentary, cross-sectional view of the flexible piping comprising a third modified or alternative embodiment of the present invention, taken generally along line 10—10 in FIG. 9.

Flexible piping 10d is shown in FIGS. 8–10 and comprises spiral-wound metal bands 24, 26 inserted in an insulation sleeve 72. The insulation sleeve 72 can be substantially tubular, with an initial inside diameter slightly greater than an outside diameter of the spiral-wound metal bands 24, 26. The sleeve 72 can be positioned downstream of and coaxially aligned with the pipe winding station 47 in an open position to receive the spiral-wound, interlocked metal bands 24, 26 as they exit the mandrel 40.

The insulation sleeve 72 can be precut to lengths slightly longer than the piping sections 12 to which it is applied whereby insulation sleeve end extensions 74 are provided. The insulation sleeve end extensions 74 can be used to overlap "T" connectors or "rain hat" connectors in exhaust piping and flue applications, and can permit an installer to substantially seal a complete piping or ducting system by overlapping the insulation sleeve extensions 74 of multiple piping sections 12 with various other system components connected thereto. The extensions 74 can project about one to two feet from the piping section ends 14 for many applications, but extensions 74 of practically any length can be provided. The insulating sleeve 72 can be applied to any of the insulated flexible piping configurations 10a–d discussed above, and can also be applied to various other flexible piping configurations for the insulation and sealing thereof.

The materials comprising the insulating bands 52, 54 and the insulating sleeve 72 can be chosen for the requirements of particular applications. For example, various plastic materials can be used, such as polypropylene, which can provide fluid sealing, corrosion resistance and thermal insulation properties and resistance to certain types of chemicals. The insulating material can also comprise various metallic foils. Still further, cloth (e.g., asbestos), fiberglass, ceramic and paper materials could be used. The metal bands 24, 26 can also comprise any suitable material, e.g. aluminum, steel, tin, copper, etc. By combining different materials in the metal bands 24, 26 and the insulating bands 52, 54, a cooperation between the different materials can be achieved whereby the flexible piping 10 has resulting functional advantages which are achieved by taking advantage of the combined characteristics of the metal and insulating band materials. Thus, the cooperative effect between these different materials can provide a wide range of beneficial operating characteristics for the resulting flexible piping 10.

It is to be understood that while certain forms of the present invention have been illustrated and described herein, it is not to be limited to the specific forms or arrangement of parts described and shown.

What is claimed and desired to be secured by Letters Patent is as follows:

1. Flexible metal piping, which includes:
  (a) a first, inner spiral winding comprising a metallic band with leading and trailing edges;
  (b) a second, outer spiral winding comprising a metallic band with leading and trailing edges, said outer winding overlying said inner winding, said leading edge of said inner metallic band being folded together with said leading edge of said outer metallic band, said trailing edge of said inner metallic band being folded together with said trailing edge of said outer metallic band, and said folded leading edges of said inner and outer metallic bands being interlocked with said folded trailing edges of said inner and outer metallic bands; and
  (c) a band of sealing material with leading and trailing edges, said sealing material band being spiral-wound in overlying relation with respect to at least one of said windings with said sealing material band leading and trailing edges engaged in sealing relation.

2. The invention of claim 1 wherein:
  (a) said sealing material band is located between said inner and said outer metallic bands.

3. The invention of claim 2 wherein:
  (a) said leading edge of said sealing material band is folded with said leading edges of said inner and said outer metallic bands, and said trailing edge of said sealing material is folded with said trailing edges of said inner and said outer metallic bands.

4. Flexible metal piping, which includes:
(a) a first, inner spiral winding comprising a metallic band with leading and trailing edges and a plurality of convolutions extending in generally parallel relation with respect to said first winding edges;
(b) a second, outer spiral winding comprising a metallic band with leading and trailing edges, said outer winding overlying said inner winding and including multiple convolutions extending in generally parallel relation with respect to said second winding edges, said leading edge of said inner metallic band being folded together with said leading edge of said outer metallic band, said trailing edge of said inner metallic band being folded together with said trailing edge of said outer metallic band, and said folded leading edges of said inner and outer metallic bands being interlocked with said folded trailing edges of said inner and outer metallic bands; (c) spiral seam means for interconnecting aid interlocked edges of said first and second windings; and
(d) a band of sealing material with leading and trailing edges, said sealing material band being spiral wound in overlying relation with respect to at least one of said windings with said sealing material band leading and trailing edges engaged in sealing relation.

5. The invention of claim 4 wherein:
(a) said sealing material band is located between said inner and outer metallic bands.

6. The invention of claim 5 wherein:
(a) said leading edge of said sealing material band is folded with said leading edges of said inner and said outer metallic bands, and said trailing edge of said sealing material is folded with said trailing edges of said inner and said outer metallic bands.

7. The invention of claim 6 wherein said interlocked leading and trailing band edges are crimped.

8. The invention of claim 4 wherein said sealing material band comprises metallic foil.

9. The invention of claim 4 wherein said sealing material band comprises a polymeric material.

10. The invention of claim 9 wherein said polymeric material comprises polypropylene.

11. The invention of claim 4 wherein said sealing material band comprises fiberglass.

12. The invention of claim 4 wherein said sealing material band comprises a ceramic material.

13. The invention of claim 4, which includes:
(a) said insulating material band comprising an inner insulating material band located between said metallic bands; and
(b) an outer sealing material band spiral-wound on said outer metallic band in overlying relation thereon.

* * * * *